April 13, 1965  D. B. REINKE  3,177,666

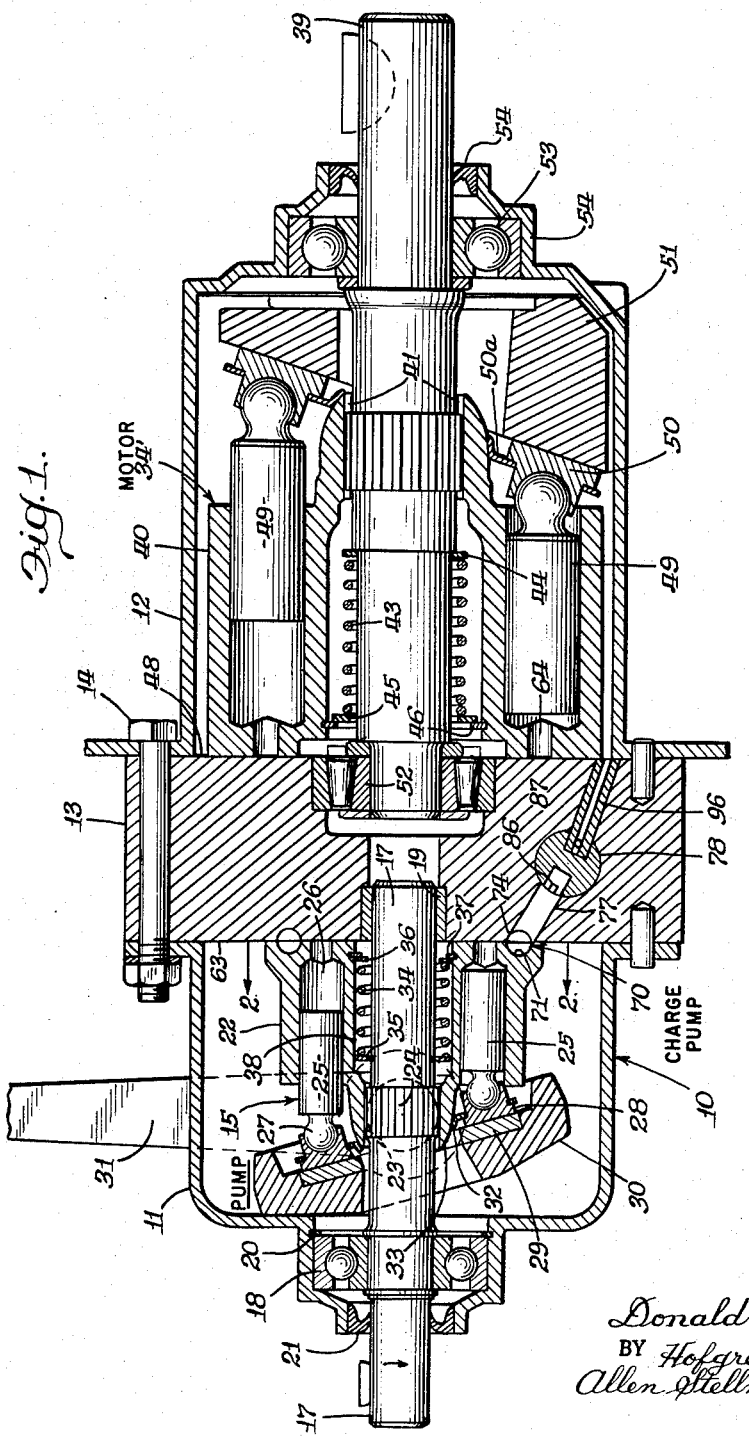

HYDROSTATIC TRANSMISSION

Filed Jan. 16, 1964  2 Sheets-Sheet 2

United States Patent Office 3,177,666
Patented Apr. 13, 1965

3,177,666
HYDROSTATIC TRANSMISSION
Donald B. Reinke, Rockford, Ill., assignor to Sundstrand Corporation, a corporation of Illinois
Filed Jan. 16, 1964, Ser. No. 338,177
9 Claims. (Cl. 60—53)

This invention relates to the art of hydrostatic transmissions. More specifically, it relates to an auxiliary pump driven with the main pump of the hydrostatic transmission for supplying make-up fluid and charge pressure to the main pump as well as control fluid in quantities to efficiently maintain the operation of the transmission.

In hydrostatic transmissions, fluid may be returned to the pump by the driven motor and/or supplied by a separate auxiliary pump. In systems where the driven motor discharges all the fluid to a tank, an auxiliary pump may deliver all the fluid required by the main pump. On the other hand, in closed systems, where the driven motor returns the motive fluid to the pump, an auxiliary pump may still be required to make up for leakage in the system and in some cases to supply control fluid. In the past, the auxiliary pump has usually been a radial gear or vane pump separate from the main pump and this results in costly and complex transmissions.

It is a primary object of this invention to provide a new and improved centrifugal pump having a minimum of moving parts and a high efficiency providing reduced costs and improved simplicity.

Another object of this invention is to provide a new and improved auxiliary pump for a hydrostatic transmission in which the moving pump parts are integrally formed with the main pump cylinder block thereby reducing costs and overall size.

A further object of the present invention is to provide a new and improved supercharging pump together with a shuttle valve for supplying make-up fluid to the low pressure side of a closed circuit transmission, as well as piston return pressure and cooling fluid, if desired.

Another object is to provide a new and improved hydrostatic transmission with a novel charge or make-up pump having a capacity inherently related to requirements.

A further object is to provide a new and improved transmission with a charge pump having output capacities proportional to input speeds to meet increasing requirements upon increased speed.

An additional object is to provide a new and improved transmission with a charge pump having output pressures proportional to input speeds to inherently limit pressures without the need of a relief valve.

A more specific object of the present invention is to provide a transmission auxiliary pump for supplying fluid to the main pump in which spiral flow is induced by impeller blades on the main pump block in a toroidal passage formed on the main pump block and cooperating pump valve plate.

Other objects and advantages will become readily apparent from the following detailed description taken in connection with the accompanying drawings, in which:

FIGURE 1 is a longitudinal sectional view of a hydrostatic transmission embodying the principles of the present invention;

Figure 3:
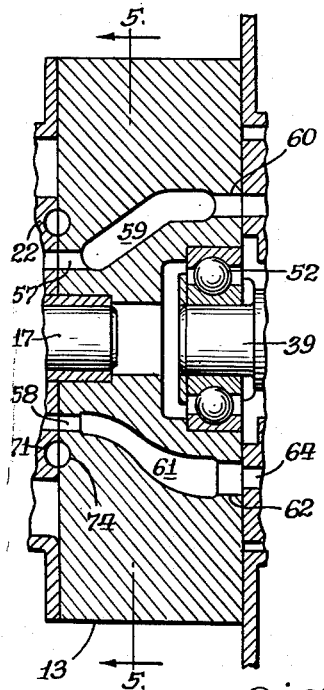
FIGURE 3 is a cross section of the valve plate structure, taken at about line 3—3 of FIGURE 5, showing the inlet and outlet ports thereof.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiments illustrated. The scope of the invention will be pointed out in the appended claims.

Referring now to FIGURE 1, the hydrostatic transmission is generally designated by numeral 10. The casing is constructed in two parts and consists of a pump casing 11 and a motor casing 12 both fixed to a valve plate 13 by bolts 14. An axial piston pump 15 is mounted within the pump casing 11 to be driven by an input shaft 17 adapted to be driven by a suitable prime mover (not shown). Bearing 18 seated within the outboard end of pump casing 11 and held by snap ring 20 rotatably supports input shaft 17. Since the interior of pump casing 11 is normally partially filled with lubricating fluid, a suitable seal 21 surrounds input shaft 17 at the outboard end of casing 11 to prevent fluid from flowing therefrom. Bearing 19 seated within valve plate 13 supports the input shaft 17 at its right end.

The axial piston pump 15 includes a rotary cylinder block 22 having a splined bore 23 connected to splines 24 on the input shaft 17. The cylinder block thereby rotates with the input shaft. Pistons 25 are slidably mounted in cylinders 26 formed within the cylinder block 22 parallel to the axis of rotation of input shaft 17 and equally spaced from one another in a concentric annular series. The left end of pistons 25 have spherical ends 27 which seat within individual bearing slippers 28, which have partially spherical seats therein for retention of the slippers on the pistons 25 while allowing pivotal movement of the slippers with respect to the pistons. Slippers 28 bear against a rotatably mounted face plate 29 on swash plate 30 which is pivotally connected to the pump casing 11, and does not rotate with input shaft 17. The swash plate may be manually or otherwise adjusted as by movement of handle linkage arm 31 to vary the displacement of the pump in opposite direction from neutral in a well known manner to control the transmission. A retaining ring 32 seated on a spherical surface 33 of cylinder block 22 holds the slippers 28 against the plate 29.

A spring 34 bears at one end against a retaining ring 35 on shaft 17 and urges the cylinder block toward the valve plate 13. The other end of the spring engages a retaining ring 36 seated against a snap ring 37 in cylinder block bore 38.

Axial piston motor 34′ is mounted within the motor casing 12. Motor cylinder block 40 drives output shaft 39 through cooperating spline 41 on the block and shaft. A spring 43 urges the cylinder block 40 against the valve plate 13 in the same manner that spring 34 urges pump cylinder block 22 against the valve plate. Washers 44 and 45 retain the spring 43 in position. The force of the spring acts through snap ring 46 seated in motor cylinder block 40 to urge the block against the face 48 of the valve plate 13. Motor pistons 49 are slidably mounted in the motor cylinder block 40 and slippers 50 are retained in position against swash plate 51 by retaining ring 50a in the manner described with respect to the pump. Output shaft 39 is mounted at its left end by bearing 52 in a counterbore in valve plate 13, and at its right end by bearing 53 mounted within a projection of motor casing 12. A seal 54 prevents the outflow of fluid from within the motor casing 12.

Figure 4:
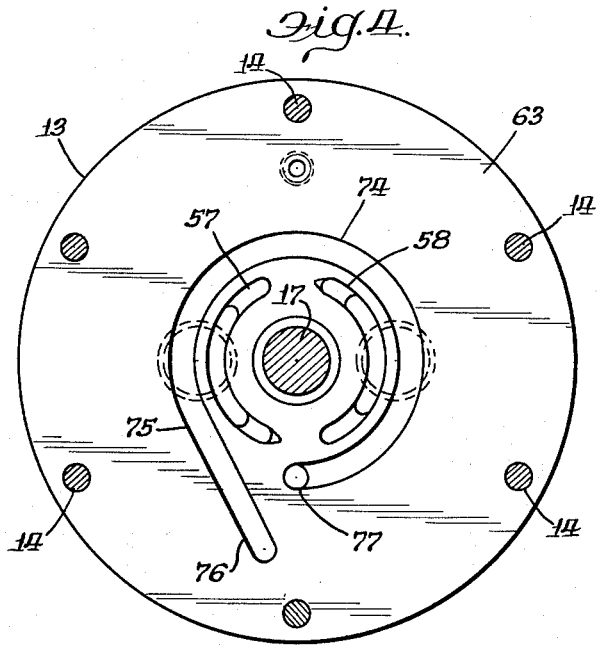
FIGURE 4 is a left side view of the valve plate structure shown in FIGURE 1.
Figure 2:
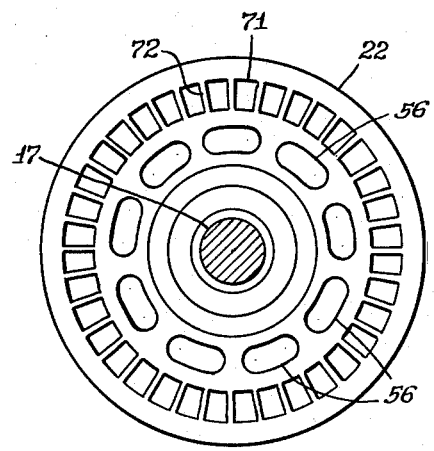
FIGURE 2 is a cross section taken along line 2—2 of FIGURE 1 showing the pump cylinder block and swash plate actuating mechanism.

Referring now to FIGURE 2 where the right end of the pump cylinder block is shown in detail, a series of spaced arcuate ports 56 in the end of the cylinder block are connected each to one of the pump cylinders 26. As the cylinder block 22 rotates, the ports 56 successively pass across pump outlet and inlet ports 57 and 58 in valve plate 13, as shown in FIGURE 4. Pump port 57 communicates with passage 59 and motor port 60, all formed within valve plate 13. Pump port 58 communicates with passage 61 and motor port 62, also formed within valve plate 13. Motor cylinder block 40 also has arcuate cylinder ports 64 on the left face thereof, as viewed in FIGURE 3, which successively communicate with motor port 60 and motor port 62 during rotation of the output shaft. Either of the passages 57, 59, 60 and 58, 61, 62 may be high pressure and the other low, depending upon the direction in which swash plate 30 is pivoted from a neutral center position normal to shaft 17, so that the motor may be driven at infinitely variable speeds in opposite directions.

The operation of the pump and motor is as follows. The input shaft 17 is connected to and driven by a prime mover, such as the gasoline engine of a tractor. Rotation of input shaft 17 drives the cylinder block 22. As swash plate 30 is adjusted to the desired pump displacement, it reciprocates the pistons 25 within the pump cylinders 26. As the pistons 25 travel to the left, as viewed in FIGURE 1, fluid is drawn into their respective cylinders 26 through inlet port 58. As the swash plate 30 reverses the direction of travel of the pistons, the fluid in cylinders 26 is compressed. When each of the ports 56 of the pump cylinder block 22 pass over outlet port 57, as an example, fluid is passed into high pressure passage 59 and motor inlet port 60. Fluid thus supplied to the motor forces the pistons 49 to the right, as viewed in FIGURE 1, thereby driving output shaft 39. As the swash plate 51 returns the pistons 49 to their left hand position, fluid is forced out of the motor cylinder block 40, through motor outlet port 62, and into low pressure passage 61 and back to the pump.

It should be understood that the transmission is readily reversible. Even though the direction of rotation of the input shaft remains unchanged, the direction of rotation of output shaft may be reversed by pivoting handle linkage arm 31 so that swash plate 30 passes through a vertical plane through the swash plate pivot. In this manner, the high and low pressure passages are reversed, and passage 61 becomes the high pressure passage while passage 59 becomes the low pressure passage.

Referring to FIGURE 1, the auxiliary or charge pump is generally designated by the numeral 70. The function of the auxiliary pump is to receive fluid from within the pump casing 11 and deliver it to the low pressure passage connecting pump and motor. If any fluid is lost through leakage, or if hot fluid is drawn off in a manner described more fully below, the charge pump 70 replenishes the supply of fluid in the system and maintains it filled. A semi-toroidal peripheral groove 71 (half circular in cross section) is formed in the end face of the pump cylinder block 22 adjacent the port plate. Equally spaced impeller blades 72 extend transversely across the semi-toroidal groove 71 and form discrete buckets in the face of the cylinder block 22. It should be understood that semi-toroidal groove 71 and struts 72 may be case or machined directly on the face of cylinder block 22, thereby providing an integral structure. Referring to FIGURES 1 and 4, the semi-toroidal groove 71 mates with a semi-toroidal passage 74 of similar cross section on the face 63 of valve plate 13. Semi-toroidal passage 74 extends through an arc of approximately 270° and has a tangential portion 75 which terminates in an inlet passage 76. After the cylinder block 22 is assembled on valve plate 13, the inlet passage 76 extends outside the periphery of the cylinder block 22 and opens to the inside of pump casing 11. At the opposite end of semi-toroidal passage 74, a make-up fluid passage 77 communicates therewith and extends into a valve bore 78 formed within the valve plate 13. As the cylinder block 22 rotates, charge pump 70 draws fluid in through inlet passage 76 from the pump casing 11, compresses the fluid which flows spirally in the toroidal passage, and expels fluid into make-up passage 77 and bore 78.

Figure 5:
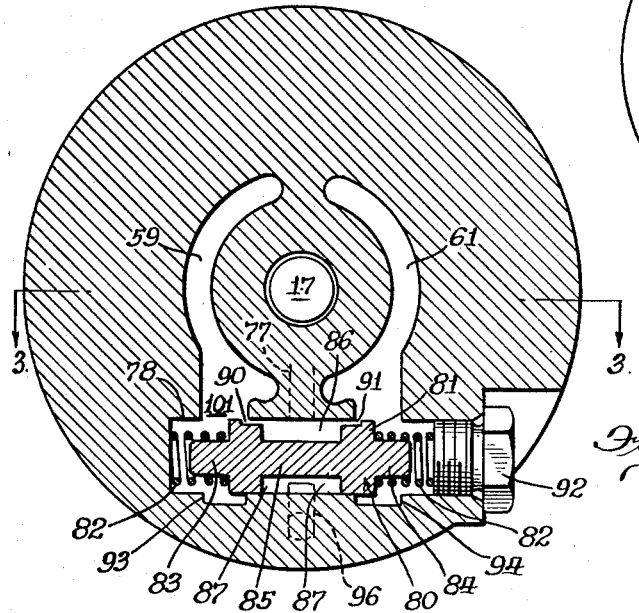
FIGURE 5 is a cross section of the valve plate structure taken along line 5—5 of FIGURE 3.

Referring now to FIGURE 5, a shuttle valve generally designated by the numeral 80 has two primary functions: (1) it permits the flow of supercharged fluid from the auxiliary pump to the low pressure side of the system; and (2) it removes hot excess oil from the low pressure line and discharges it to the motor casing 12. When no external force is exerted upon shuttle valve member 81, springs 82 urge the valve to its central position in bore 78. Valve member 81 consists of a central cylindrical portion 85 slidable in bore 78 with opposite reduced projections 83 and 84 at each end thereof for receiving springs 82. Viewing FIGURES 1 and 5, a slot or groove 86 of rectangular cross section is formed in the upper surface of cylindrical portion 85 and has reduced extensions 90 and 91 at opposite ends. On the lower surface of cylindrical portion 85, another rectangular slot or groove 87 is formed therein. A plug 92 is threaded in the right end of bore 78 to prevent fluid from leaking therefrom and to permit assembly of the valve. Pockets 93 and 94 are formed in the lower portion of bore 78 to permit the flow of overheated oil from the system. A hot oil tube 96 projects into groove 87 thereby preventing rotation thereof, as seen in FIGURE 1, and extends to the face 48 of valve plate 13, opening into the motor casing 12.

The operation of the auxiliary charging pump and hot oil discharge components are as follows. As the pump cylinder block rotates, the auxiliary charge pump 70 draws fluid from the interior of the casing through inlet passage 76 to the toroidal passage 71, 74. The blades 72 carry the fluid around the passage, while centrifugal force carries the fluid radially outward, thereby compressing the same. The impelling and centrifugal forces produce a spiral flow of the fluid as it travels around the toroidal passage. Compressed fluid is expelled through make-up outlet passage to the interior of groove 86. Since the pressure in high pressure passage 61 (as an example) is greater than that in low pressure passage 59, the shuttle valve 80 is forced to the left in FIGURE 5. Notch 90 and recess 86 are thereby exposed to chamber 101 which communicates with the low pressure passage 59. Fluid from the charge pump 70 is thereby delivered to the low pressure passage 59, and from there to the pump inlet 58. The feeding of supercharged fluid to the low pressure passage 59 continues so long as the pump remains in operation and so long as the swash plate is not reversed. If the swash plate is reversed, the spool valve moves to its right hand extreme position and supercharged fluid is admitted through recess 86 into passage 61 which then is a low pressure passage.

Assuming the shuttle valve 80 to be in its left extreme position, hot oil is discharged from the low pressure passage 59, through pocket 93, into groove 87, through the hot oil tube 96, and then into the motor casing 12.

An important feature of the operation of the pump 70 is that any leakage around the pump inlet and outlet ports will be scooped up by the blades in the toroidal passage which functions as a collector therefor. The charge pump serves to replenish both the fluid lost by leakage and the hot fluid discharged through hot oil pipe 96.

The present auxiliary pump, which is a preferred embodiment, develops an output pressure of 60 p.s.i. at 3600 r.p.m. in a very small unit, effects the smooth retraction of the pump pistons during their intake stroke. The pressure head developed by the charge pump is directly proportional to the square of the speed of the input shaft 17. The force required to retract the pistons 25 during the intake stroke of the pump is also proportional to the square of the speed of the input shaft 17. Therefore, as the speed of the pump increases, the charge pump will deliver fluid to the pump inlet having a head sufficient to overcome the forces opposing the return of the pistons to their retracted positions.

While centrifugal pumps normally develop only about six-tenths of the theoretical head, the present toroidal centrifugal pump develops two to three times its theoretical outlet pressure, based on conventional methods of determining centrifugal head or pressure, using blade tip velocity. The technical explanation for these improved results appears to be that the fluid traveling through the present charge pump follows a spiral or corkscrew path due to the centrifugal force. The circular cross-sectional surfaces of the toroidal passage serve to compress the fluid as it flows radially outwardly in its spiral path.

It is unnecessary to provide a pressure relief valve on the output of the charge pump 70 in the present device where it has heretofore been necessary to provide pressure relief valves on the supercharging system so that excessive pressures do not develop in the main pump inlet. However, in this type of pump because the head developed thereby is proportional to the square of the speed of the pump, the head will never exceed a predetermined amount in the event of over-speeding. A pressure relief valve is therefore unnecessary and allows the transmission to be made with a fewer number of parts.

It will be appreciated by those skilled in the art that the charge pump 70, in addition to supplying fluid to the inlet of the main pump, may also be used to deliver fluid to a pump swash plate control system or to deliver fluid to an accessory device.

While an illustrative embodiment of the auxiliary centrifugal pump has been shown and described in detail, it will be appreciated that the pump may take different forms within the scope of the basic invention. For example, the toroidal passage 74 on the valve plate 13 may be broken up into several individual passages, each with inlet and outlet ports. These may be connected in parallel to increase the flow for a given toroidal section. Alternatively, one such separate passage may be connected to the pump inlet, while another passage may be connected to a swash plate control or an accessory drive.

I claim:

1. A centrifugal pump comprising a rotatably mounted member having a flat radial surface having a semi-toroidal groove therein, a plurality of blades extending transversely of said groove, means for driving said rotatably mounted member, a plate having one face thereof mounted adjacent to and contacting said flat radial surface, said plate having a semi-toroidal passage in said face complementary to said groove over a first portion of the length of said passage, a second portion of said semi-toroidal passage extending away from said groove and said rotatably mounted member and forming pump inlet means, and a pump outlet port in said semi-toroidal passage spaced from said inlet means.

2. A hydraulic pumping apparatus for compressing and delivering fluids comprising a cylinder block having a plurality of cylinders formed therein, pistons mounted in said cylinders for compressing fluid, a block mounted adjacent to and contacting said cylinder block, means for rotating one of said blocks, an auxiliary pump for supplying fluid to said cylinders including a semi-toroidal groove in said rotatable block, a semi-toroidal passage in the other block forming with the groove a toroidal compression passage, impeller blades extending transversely across said groove, and inlet and outlet means connected to said compression passage.

3. In a pumping apparatus: a hydraulic swash plate pump comprising a rotatable cylinder block having a plurality of cylinders extending parallel to the axis of rotation thereof, pistons slidable in said cylinders, a swash plate adjacent said cylinder block and engaging ends of said pistons, means for rotating said cylinder block, and a valve plate mounted adjacent to the cylinder block opposite said swash plate having arcuate inlet and outlet ports formed therein communicating with said cylinders during rotation of said cylinder block, said ports being formed on a first radius; an auxiliary pump for supplying fluids to said inlet port including, a semi-toroidal groove on said cylinder block, impeller blades extending transversely across said groove, a semi-toroidal passage on said valve plate communicating with said groove and extending along an arc defined by a radius longer than said first radius, an inlet to said semi-toroidal passage, and an outlet port connecting said semi-toroidal passage and said arcuate valve plate inlet port.

4. A hydrostatic transmission comprising: a main pump including a rotatable cylinder block having cylinders formed therein, pistons slidable in said cylinders having ends extending from a first end of said cylinder block, a swash plate engaging said piston ends, a valve plate mounted adjacent said cylinder block and engaging the cylinder block at the end thereof opposite said swash plate, said valve plate having port means communicating with said cylinders; an axial piston motor having an inlet passage connected to said port means; an auxiliary pump for supplying fluid to said main pump including, a semi-toroidal groove formed on said cylinder block, blades extending across said semi-toroidal groove, a semi-toroidal passage in said valve plate complementary to at least a portion of said semi-toroidal groove thereby forming a toroidal passage, and an auxiliary pump outlet passage in said valve plate connecting said semi-toroidal passage with said port means.

5. A hydrostatic transmission comprising, a main pump having a rotary member, means within said rotary member for compressing fluid, a valve plate engaging said rotary member and having pump outlet and inlet ports therein communicating with said means for compressing fluid during rotation of said member, a fluid motor mounted adjacent said valve plate, said valve plate having motor inlet and outlet ports formed therein adjacent said motor, a high pressure passage connecting the pump outlet port and the motor inlet port, a low pressure passage connecting the motor outlet port and the pump inlet port, an auxiliary pump for supplying make-up fluid to said low pressure port including; a groove integrally formed on said rotary member, impeller blades extending across said groove, a passage on said valve plate complementary to said groove over at least a portion of the length thereof, and means connecting said complementary passage to said low pressure passage.

6. A hydrostatic transmission comprising a main pump having a rotatable cylinder block, said block having cylinders formed therein parallel to the axis of rotation thereof, pistons slidable in said cylinders having ends extending from one side of said cylinder block, a variable angle swash plate engaging said ends of said pistons, a valve plate mounted adjacent said cylinder block and having arcuate pump inlet and outlet ports formed in one side thereof, an axial piston motor mounted adjacent the other side of said valve plate, said valve plate having motor inlet and outlet ports formed therein on said other side, a high pressure passage connecting said pump outlet port and said motor inlet port, a low pressure passage connecting said motor outlet port and said pump inlet port, a closed bore in said valve plate, each end of said bore communicating with one of said high and low pressure passages, a shuttle valve slidable in said bore, an auxiliary pump for supplying make-up fluid to said low pressure passage including; a semi-toroidal groove in said cylinder block adjacent said valve plate, impeller blades extending across said groove, a semi-toroidal passage in said valve plate complementary to at least a portion of said semi-toroidal groove, said semi-toroidal groove and passage extending on a circle scribed about the axis of rotation of said cylinder block, said semi-toroidal groove and passage being further from said axis of rotation than said pump inlet and outlet ports, and means connecting said semi-toroidal passage to said bore whereby the shuttle valve will admit auxiliary pump fluid to said low pressure passage.

7. A hydrostatic transmission comprising a casing, an axial piston pump in said casing having a cylinder block, a swash plate mounted in said casing for varying the displacement of said pump, a valve plate mounted within said casing having arcuate pump inlet and outlet ports therein, an axial piston motor mounted adjacent the valve plate, motor inlet and outlet ports formed in said valve plate adjacent said motor, a high pressure passage in said valve plate connecting the pump outlet port and the motor inlet port, a low pressure passage connecting the motor outlet port and the pump inlet port, an auxiliary pump for supplying make-up fluid to said low pressure passage including; a semi-toroidal groove on said cylinder block adjacent said valve plate having impeller blades therein, a semi-toroidal passage on said valve plate communicating along the length thereof with said semi-toroidal groove, an inlet passage for said auxiliary pump connected to said semi-toroidal passage and opening into said casing, a shuttle valve mounted within a bore in said valve plate, one end of said bore communicating with said high pressure passage, the other end of said bore communicating with said low pressure passage whereby the fluid in said high pressure conduit forces the valve to one end of said bore, means for connecting said semi-toroidal passage to said bore to admit auxiliary pump fluid to said low pressure passage, and tube means extending from said bore for discharging hot excess fluid from said high pressure passage.

8. A hydraulic pumping device for compressing and delivering fluids comprising a cylinder block having a plurality of cylinders formed therein, pistons mounted in said cylinders for compressing fluid, a second block mounted adjacent to and contacting said cylinder block, said second block having an inlet port and an outlet port therein, means for rotating one of said blocks, an auxiliary pump for compressing fluid having impeller blades integrally formed on said rotatable block and cooperating with the other block to compress fluid, and conduit means connecting the outlet of said auxiliary pump to said inlet port.

9. A hydraulic pumping apparatus for compressing and delivering fluids comprising a cylinder block having a plurality of cylinders formed therein communicating with a valving surface of said cylinder block, pistons mounted in said cylinders for compressing fluid, a valve block adjacent to said valving surface having inlet and outlet ports communicating with said cylinders, means for rotating one of said blocks, a self-limiting centrifugal pump for compressing fluid by directing the fluid in a corkscrew path having impeller means integral with said rotating block and cooperating with the other block to compress fluid supplied thereto.

References Cited by the Examiner
UNITED STATES PATENTS

| 1,665,687 | 4/28 | Derrick | 103—96 |
| 1,811,651 | 6/31 | Schlachter | 103—96 |
| 3,036,434 | 5/62 | Mark | 60—53 |

JULIUS E. WEST, *Primary Examiner.*

EDGAR W. GEOGHEGAN, *Examiner.*